United States Patent
Anderson et al.

(10) Patent No.: US 11,404,180 B2
(45) Date of Patent: Aug. 2, 2022

(54) METHOD FOR PRODUCING COLLIMATORS AND OTHER COMPONENTS FROM NEUTRON ABSORBING MATERIALS USING ADDITIVE MANUFACTURING

(71) Applicant: UT-Battelle, LLC, Oak Ridge, TN (US)

(72) Inventors: David C. Anderson, Knoxville, TN (US); Anibal J. Ramirez-Cuesta, Knoxville, TN (US); Matthew B. Stone, Oak Ridge, TN (US); Amelia M. Elliott, Cleveland, TN (US); Derek H. Siddel, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 558 days.

(21) Appl. No.: 16/155,134

(22) Filed: Oct. 9, 2018

(65) Prior Publication Data
US 2019/0108923 A1    Apr. 11, 2019

Related U.S. Application Data

(60) Provisional application No. 62/569,771, filed on Oct. 9, 2017.

(51) Int. Cl.
| | | |
|---|---|---|
| *B29C 64/153* | (2017.01) | |
| *G21K 1/04* | (2006.01) | |
| *G21G 4/02* | (2006.01) | |
| *G21F 1/00* | (2006.01) | |
| *G21C 11/02* | (2006.01) | |
| *B33Y 10/00* | (2015.01) | |

(52) U.S. Cl.
CPC ............ *G21K 1/046* (2013.01); *B29C 64/153* (2017.08); *G21C 11/028* (2013.01); *G21F 1/00* (2013.01); *G21G 4/02* (2013.01); *B33Y 10/00* (2014.12)

(58) Field of Classification Search
CPC ..................................................... B29C 64/165
See application file for complete search history.

(56) References Cited

U.S. PATENT DOCUMENTS

| | | | |
|---|---|---|---|
| 6,375,874 B1 * | 4/2002 | Russell ................. | B33Y 40/00 264/28 |
| 2014/0255647 A1 * | 9/2014 | Johnson ................ | B33Y 10/00 428/118 |
| 2018/0104793 A1 * | 4/2018 | Franke .................... | B24D 3/14 |
| 2018/0126515 A1 * | 5/2018 | Franke .................... | B24B 1/04 |

(Continued)

OTHER PUBLICATIONS

Soller, W., "A New Precision X-Ray Spectrometer", University of Cincinnati, Mar. 21, 1924, pp. 158-167.

(Continued)

*Primary Examiner* — Alison L Hindenlang
*Assistant Examiner* — Asha A Thomas
(74) *Attorney, Agent, or Firm* — Warner Norcross + Judd LLP

(57) ABSTRACT

Collimators and other components for use in neutron scattering experiments or to provide neutron shielding in nuclear reactors or accelerator based neutron sources are produced by additive manufacturing from neutron absorbing material, such as boron carbide ($B_4C$) or isotopically enriched boron carbide ($^{10}B$).

11 Claims, 4 Drawing Sheets

(56) References Cited

U.S. PATENT DOCUMENTS

2018/0297113 A1* 10/2018 Preston .................. B22F 10/40
2019/0160739 A1* 5/2019 Olson .................. B29C 64/165

OTHER PUBLICATIONS

Shirane, G. et al., "Neutron Scattering with a Triple-Axis Spectrometer Basic Techniques", Cambridge University Press, Feb. 2002, Table of Contents.

Olsson, A. et al., "Boron carbide composite apertures for small-angle neutron scattering made by three-dimensional printing", Journal of Applied Crystallography (2016), 49, pp. 696-699.

Stone, M.B. et al., "Characterization of plastic and boron carbide additive manufactured neutron collimators", Review at Scientific Instruments (2017), 88, pp. 123102-1-7.

* cited by examiner

METHOD FOR PRODUCING COLLIMATORS AND OTHER COMPONENTS FROM NEUTRON ABSORBING MATERIALS USING ADDITIVE MANUFACTURING

CROSS-REFERENCE TO RELATED APPLICATION

This application claims the benefit of U.S. Provisional Application No. 62/569,771 filed Oct. 9, 2017. The disclosure of this patent application is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

TECHNICAL FIELD

The present invention relates to manufacture of components from neutron absorbing materials using additive manufacturing.

BACKGROUND OF THE INVENTION

One way to improve the performance of a neutron scattering instrument is to improve its signal to noise ratio by background reduction. Background reduction refers to reducing or eliminating neutrons coming from sources other than the sample being investigated.

Additionally, neutron instruments and sources, including nuclear reactors and accelerator based spallation neutron sources, can include biological shielding from both gamma and neutron radiation to protect people and the environment. Background reduction and neutron shielding for thermal neutrons is often accomplished by use of neutron absorbing materials like boron, cadmium, lithium and gadolinium. The forms in which these materials are available are frequently limiting with respect to the ways they can be used to shield neutrons. For example, boron is commonly used in nuclear reactors and neutron scattering instruments in the form of boron carbide ($B_4C$), which is a ceramic. Boron carbide is typically available in plates, but can also be mixed with an epoxy and be cast (resulting in a greatly reduced percentage of boron carbide by volume), or can be formed or cast into simple shapes as a "green" part and sintered. The cost of boron carbide plates is high, the manufacturing time is long, and the pieces are often broken during shipping or while being handled after delivery. If the parts do not fit (because of a design or manufacturing error) they are very difficult and sometimes impossible to modify. Obviously, if the parts cannot be used because of a fit problem or because they are broken, the cost remains high but no benefit in signal to noise ratio is realized.

Neutron collimators are a common way to reduce background for neutron scattering experiments at thermal and cold neutron sources. Simple collimation can be achieved with apertures or pin-holes made of neutron absorbing materials in the neutron beam. More often Stiller collimators are used to provide neutron collimation without overly sacrificing neutron flux. One method for manufacturing a Stiller neutron scattering collimator is to stretch sheets of bi-axially oriented polyethylene terephthalate, also known as Mylar, or another film between opposite sides of a structural frame. The film is then coated with a neutron absorbing material like boron carbide or gadolinium oxide ($Gd_2O_3$). This technique limits the geometry of a neutron scattering collimator to horizontally or vertically parallel blades, or blades that have an angular divergence in one plane (e.g., a radial collimator). Mylar is a hydrocarbon containing plastic material $((C_{10}H_8O_4)_n)$. Because hydrogen has a large incoherent cross section for neutron scattering, it has the potential to increase unwanted background and decrease the effectiveness of the collimator. Simple blades of cadmium metal can also be used for the collimating medium. These blades have a greater thickness than the Mylar films and they tend to bend with use, further decreasing their transmission of the neutron beam.

Neutron absorbing materials are also frequently used in other kinds of shielding such as beam defining apertures, masks, and large area background reducing/biological shielding barriers. Typically, material for these types of applications are available in sheets. For example, boron carbide plates, cadmium sheets, and borated polyethylene sheets are all available commercially. Cadmium sheets can be bent or rolled, and have basically the same manufacturing limitations as any sheet metal, but also have industrial hygiene issues because they are a carcinogen. Boron carbide plates and borated polyethylene sheets can be applied as flat panels, but making curved shapes, or more complex shapes is difficult to impossible depending on the application. In addition, the hydrogen content of borated polyethylene makes it unsuitable for use near the direct neutron beam of neutron scattering instruments.

Additive manufacturing of a boron carbide polymer blend has been accomplished using fused deposition modeling (FDM). See Anders Olsson & Adrian R. Rennie, *Boron carbide composite apertures for small-angle neutron scattering made by three-dimensional printing*, J. Appl. Cryst. 696 (2016). The paper describes preparing a 60% (by weight) $B_4C$/Acrylonitrile Butadiene Styrene (ABS) composite filament and also a 30% (by weight)$^{10}$B/ABS composite filament. The filaments were prepared by dissolving ABS pellets in acetone, then mixing $B_4C$ or $^{10}B$ before extruding filament on a Filastruder, which was then used to 3D print apertures using an Ultimaker 2 FDM printer.

SUMMARY OF THE INVENTION

Neutron collimators and other components for use in neutron scattering experiments or to provide neutron shielding in nuclear reactors or accelerator based neutron sources can be produced by additive manufacturing from neutron absorbing material, such as boron carbide ($B_4C$) or isotopically enriched boron carbide ($^{10}B$). Utilization of additive manufacturing, also known as 3D printing, enables production of components with complex geometry that would be unmanufacturable through standard manufacturing processes, e.g., impossible or cost prohibitive to machine, cast, or wire electrical discharge machine (EDM) cut.

Some embodiments of the present invention provide the ability to manufacture complex shaped components with neutron absorbing powder using additive manufacturing and infiltrate those components with an additive to form a solid shape or optionally to then sinter the additively manufactured infiltrated parts into robust neutron absorbing parts.

The present invention provides a system and method of additively manufacturing one or more components from neutron absorbing material, such as neutron absorbing powder. In particular, one embodiment of the system and method of additively manufacturing a component from neutron absorbing material produces a component with less than about 5% (by weight) hydrogen, and in some embodiments less than about 2% (by weight) hydrogen. Using a neutron absorbing material directly in the additive manufacturing process enables the resulting parts to have much higher absorption cross section by volume than a coated part, and greatly reduces or eliminates the amount of hydrogen in the part by limiting hydrocarbon containing plastic in the manufacturing process. The additive manufacturing process also allows tailoring the structure of the neutron collimator for more difficult experiments with complicated scattering geometries.

One embodiment of a method of additively manufacturing a neutron absorbing component with an additive manufacturing printer includes repeatedly spreading neutron absorbing powder into layers to form a powder bed on a build platform, repeatedly and selectively binding the layers of neutron absorbing powder with binder to produce the neutron absorbing component in the powder bed on the build platform, curing the neutron absorbing component, and de-powdering the neutron absorbing component from the powder bed. The process may also include infiltrating the neutron absorbing component with an additive, such as ethyl cyanoacrylate.

In another embodiment, a method of additively manufacturing a component with a binder jet additive manufacturing printer includes loading neutron absorbing powder into a powder feed supply of the binder jet additive manufacturing printer, positioning a build platform of the binder jet additive manufacturing printer, spreading the neutron absorbing powder from the powder feed supply into a layer on the build platform, and selectively depositing binder with a movable binder jet additive manufacturing print head on the layer of neutron absorbing powder on the build platform. The positioning, spreading, and selective depositing of binder can be repeated to binder jet print a neutron absorbing component in a powder bed on the build platform. The process may include curing and de-powdering the neutron absorbing component. The process may also include infiltrating the neutron absorbing component with an additive, such as ethyl cyanoacrylate or another adhesive. Utilization of binder jet additive manufacturing enables production of components with complex geometry that would be unmanufacturable through fused deposition modeling, e.g., impossible or cost prohibitive to produce.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

Additive manufacturing can produce components with complex geometries by shaping materials layer-by-layer. A neutron absorbing powder can be used to additively manufacture neutron absorbing components using an additive manufacturing printer, such as a binder jet 3D printer. The components can be de-powdered to produce a functional neutron absorbing component, such as a neutron collimator with a complex geometry. The neutron absorbing components can also be cured and infiltrated with an additive to strengthen the components. Curing may be performed before and/or after the infiltration.

One example of a neutron absorbing component that can be produced with the present invention is a neutron absorbing collimator. The collimator can be directly printed from neutron absorbing powder, such as boron carbide. The boron carbide is not applied as a coating to an additive manufactured substrate—the neutron absorbing powder, boron carbide in one embodiment, is used directly in the additive manufacturing process.

Figure 1:
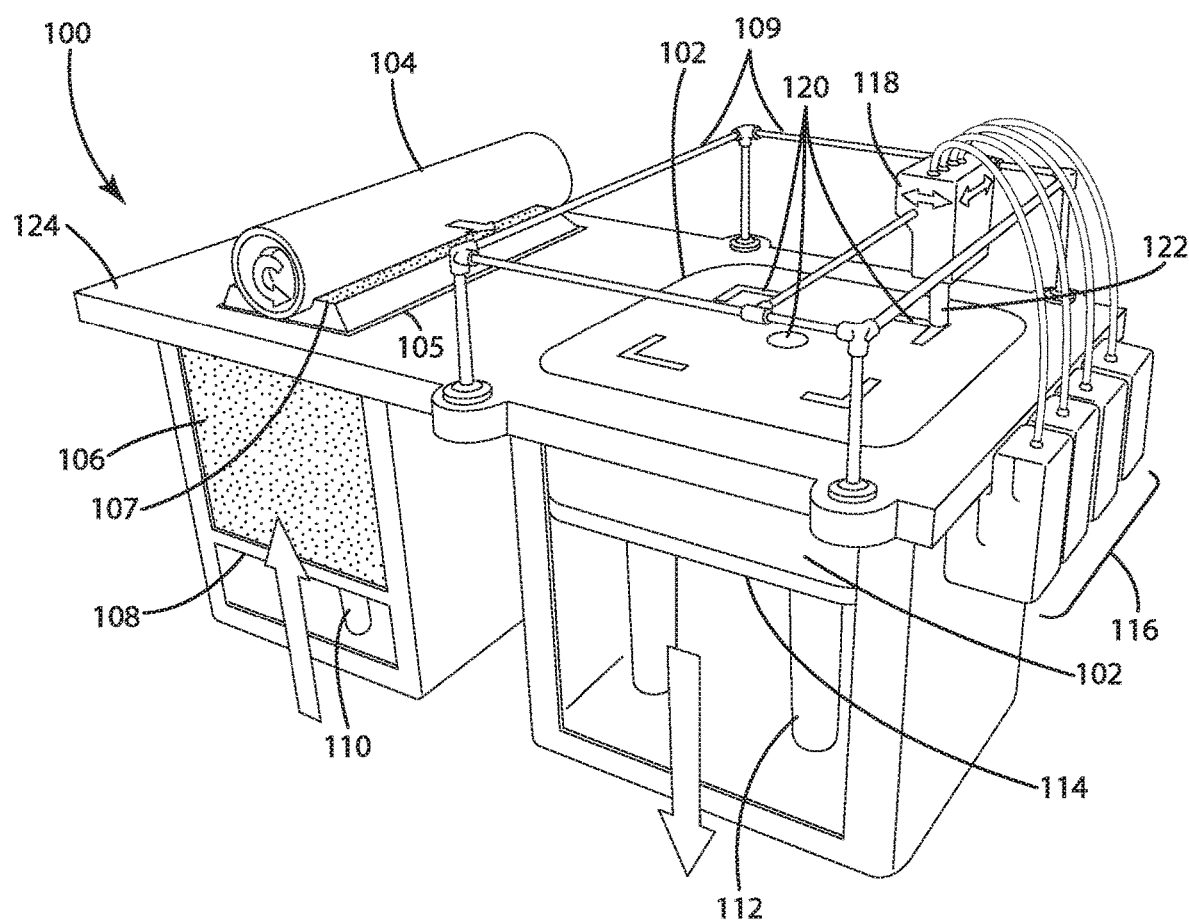
FIG. 1 is a representative perspective view of one embodiment of a binder jet additive manufacturing printer for use in manufacture of components from neutron absorbing material.
Figure 2:
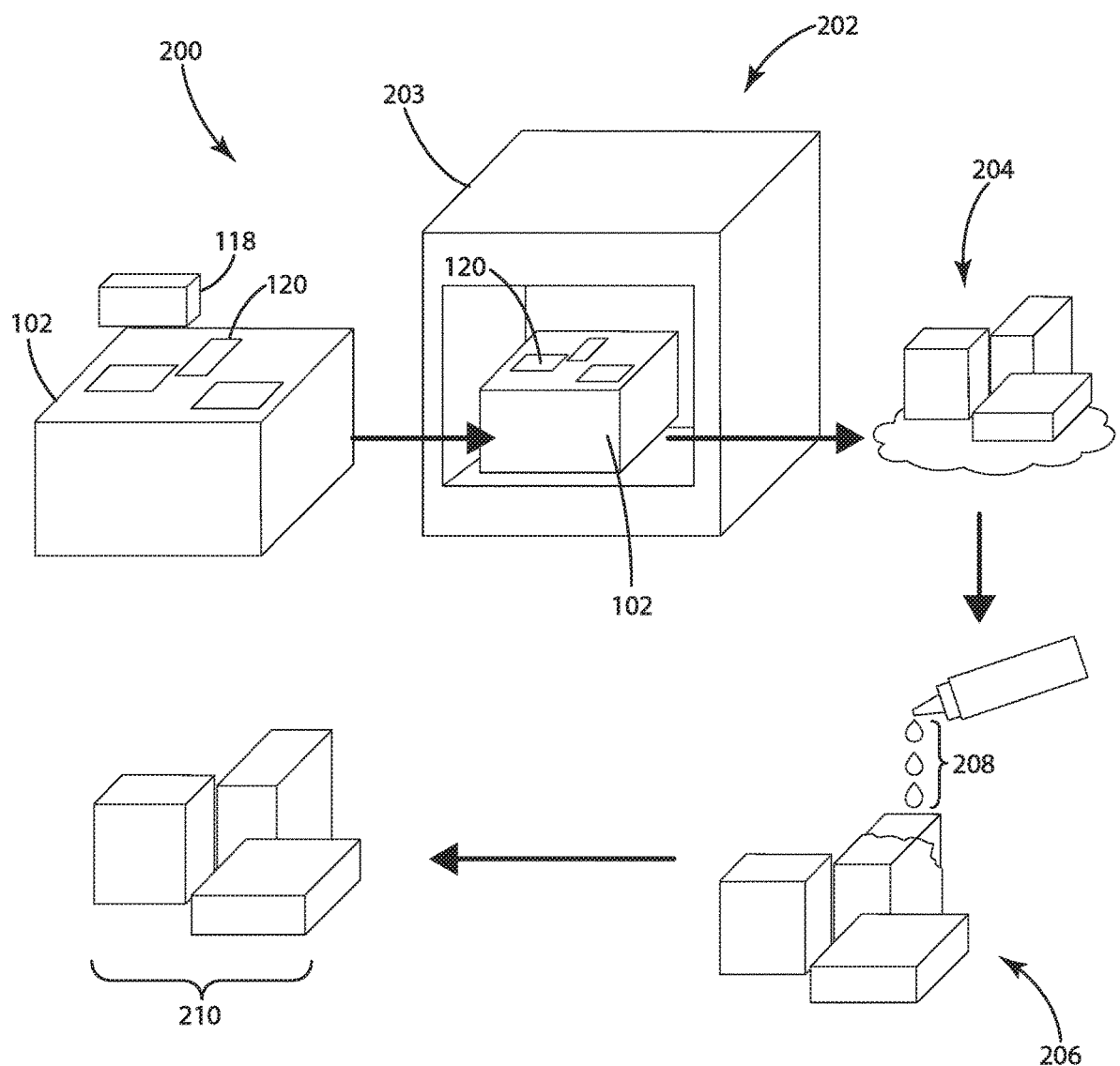
FIG. 2 is a representative flow diagram showing one embodiment of a method additive manufacture of components from neutron absorbing materials.

Binder jet additive manufacturing is a specific type of additive manufacturing utilized in connection with an embodiment of the present invention. FIG. 1 shows a representative perspective view of a binder jet printer 100 capable of producing neutron absorbing components. FIG. 2 shows a representative flow diagram illustrating a method of producing neutron absorbing components in accordance with one embodiment of the present invention.

One embodiment of a method of producing a component from neutron absorbing powder, for example boron carbide, will be described in connection with FIGS. 1 and 2. Specifically, the first step 200 shown in FIG. 2 of producing a powder bed 102 including neutron absorbing components 120 will be described in connection with the exemplary and representative binder jet 3D printer shown in FIG. 1.

Referring to FIG. 1, neutron absorbing powder 106 can be loaded onto a powder feed supply platform 108 that is movable by a powder feed supply piston 110 to supply fresh neutron absorbing powder 107 through aperture 105 in the printer housing 124 during printing. In other embodiments, another dispenser system may be utilized to supply fresh neutron absorbing powder during printing. Neutron absorbing powder 107 can be transported to the powder bed 102 located on the build platform 114 by a leveling roller 104 or other powder transport device. The leveling roller 104 or other spreading device can spread the fresh neutron absorbing powder 107 into a thin layer. The specific thickness of the neutron absorbing powder layer can vary depending on the application and can be controlled by positioning the height of the build platform 114. From there, the binder jet printer 100 selectively deposits binder droplets 122 from one or more of the binder feeders 116 onto the layer using an inkjet print head 118 that results in a pattern of binder on the layer that together with additional layers of neutron absorbing powder and binder eventually forms one or more neutron absorbing components 120. In the illustrated embodiment, the printer head can move along rails 109 in two axes.

After the binder is deposited, the build volume is dropped by actuating the build platform pistons 112 or other repositioning system to reposition the build platform 114 so that fresh neutron absorbing powder 107 can be spread, and the process can be repeated until the one or more neutron absorbing components 120 have been formed in the powder bed 102. Once all the layers are finished and the one or more neutron absorbing components 120 are complete in powder bed 102, the powder bed 102 can be transported to a curing oven for the curing step 202.

In the current embodiment, the powder bed 102 including the neutron absorbing components 120 are heated to about 200 degrees Celsius to cure the neutron absorbing components 120 by driving off or evaporating the solvent from the binder. This curing process increases the strength and binds the components together. In alternative embodiments, the curing temperature may be higher or lower, depending on a variety of factors, for example depending on the particular characteristics of the binder used during the additive manufacturing. In some alternative embodiments, the curing oven may be foregone altogether. For example, in some embodiments, after depositing binder on a layer, but before spreading the next layer of neutron absorbing powder, the solvent in the binder can be evaporated with a lamp installed on the print head or elsewhere in the printer.

The resulting bound neutron absorbing components can be de-powdered 204. De-powdering is the process of removing the neutron absorbing components 120 from the powder bed 102. For example, de-powdering can include repeated vacuuming, brushing, and blowing with compressed air. De-powdering can be done manually at a de-powdering table or automatically/semi-automatically with assistance from a de-powdering unit.

Some binder jet printing processes include a sintering step. Some neutron absorbing powders, such as boron carbide, do not sinter at temperatures that can be easily achieved by readily available additive manufacturing furnaces. For example, pressureless sintering of neutron absorbing components made from boron carbide may be possible at around 2400 degrees Celsius. As an alternative to sintering, some embodiments include an infiltration step to strengthen the neutron absorbing component. Some neutron absorbing materials, such as gadolinium oxide are easier to sinter than boron carbide. Accordingly, when using such materials the neutron absorbing components can be sintered instead or in addition to infiltrating them with an additive.

The neutron absorbing powder, such as boron carbide, can be printed with or without a bonding agent such as a polymer or metal in order to enable post processing sintering of the infiltrated product to enhance its mechanical properties. The neutron absorbing powder particles, e.g., boron carbide particles, can also be prepared before the printing process by coating with a bonding agent in order to improve post process sintering or enable sintering at lower temperatures. In other alternative embodiments, both sintering and infiltration steps can be omitted entirely.

The method can include infiltrating 206 the de-powdered component with an additive 206. For example, ethyl cyanoacrylate adhesive 208 can be used to infiltrate the neutron absorbing components to provide additional strength to the components. In the embodiment depicted in FIG. 2, a bottle of ethyl cyanoacrylate is used to manually dispense ethyl cyanoacrylate on to the surface of the neutron absorbing components. Once the additive is infiltrated into the neutron absorbing components, the process may include curing the neutron absorbing components depending on the properties of the infiltrated additive. For example, ethyl cyanoacrylate cures at room temperature. In the current embodiment, the neutron absorbing components 210 are functional once the additive is infiltrated into the neutron absorbing component and cured. That is, in the current embodiment, the neutron absorbing component, once infiltrated with cyanoacrylate, has sufficient structure to hold its own shape, be handled, and be functionally useful in its capacity as a neutron absorbing component in neutron scattering equipment, such as a neutron absorbing collimator.

It can be preferable to avoid or limit hydrogen in neutron scattering experiment equipment, such as collimators, because hydrogen is a large incoherent neutron scatterer, which means it increases unwanted background. The resultant neutron absorbing components produced by some embodiments have about 40% (by weight) neutron absorbing powder, in the current embodiment boron carbide, with the remainder being the infiltrant, in the current embodiment cyanoacrylate. Cyanoacrylate has some hydrogen, which contributes to the overall hydrogen content of the neutron absorbing components, however the total amount of hydrogen in the neutron absorbing components is less than 5% by weight, and in some embodiments less than 2% by weight, by calculation.

A variety of different neutron absorbing powders that have different characteristics that can be utilized to additively manufacture neutron absorbing components. Examples of some of the neutron absorbing powders that can be used in different embodiment of the present invention include boron carbide ($B_4C$), isotopically enriched boron carbide ($^{10}B$), cadmium or cadmium containing materials (Cd), Gadolinium Oxide ($Gd_2O_3$), lithium (and lithium containing compounds such as Lithium-6 Carbonate ($^6Li_2CO_3$)), and titanium diboride ($TiB_2$) to name a few. The particle size of the neutron absorbing powder can be selected depending on the particular application. In one embodiment, where the neutron absorbing powder is boron carbide, the starting particle size is about 18 μm.

Composite neutron absorbing containing materials can be used to manufacture components of mechanisms used in or around neutron beams in order to reduce background. For example, composite materials can be made by mixing neutron absorbing powder, such as boron carbonite powder, with other ceramic or metal powders to tailor the material to its application. For example, magnets with neutron absorbing characteristics can be made by mixing the neutron absorbing powder with iron or neodymium powder.

A variety of different binders can be used in connection with different embodiments of the additive manufacturing process. The type of binder can be selected depending on various factors, for example the type of neutron absorbing powder and its interaction with the binder, the binder curing process, the density of the binder, the application characteristics of the binder, and the amount of hydrogen in the binder to name a few potential factors. In the current embodiment, a commercially available binder available from ExOne® headquartered at 127 Industry Boulevard, North Huntingdon, Pa. 15642, is utilized for depositing on the neutron absorbing powder layers to form the neutron absorbing components. In alternative embodiments, other binders can be utilized. The binder may be selected to limit the amount of hydrogen in the ultimate neutron absorbing components.

A variety of different additive manufacturing, or 3D, printers can be utilized to produce components from neutron absorbing powder. Binder-jet 3D printers are especially well-suited for implementing the various embodiments of the method of additively manufacturing a component from neutron absorbing powder. For example, the x1Lab, the Innovent, and the mFlex binder jet 3D printers available from ExOne®, can be utilized to binder jet additive manufacture neutron absorbing components, such as neutron absorbing collimators. In addition, different embodiments can work with other binder jet printers, including open source binder jet printers. The 3D printer may include a control system with one or more controllers for controlling the various moving parts of the printer. For example, the controller may control the neutron absorbing powder supply, along with its transport to the powder bed and spreading of the powder. Further, the control system may control the positioning of the powder bed and the print head, both its positioning and depositing of binder. The control system may control the printer to produce a 3D printed component according to a pattern or digital design, such as a 3D drawing of the neutron absorbing component, such as a neutron absorbing collimator.

Figure 3A:
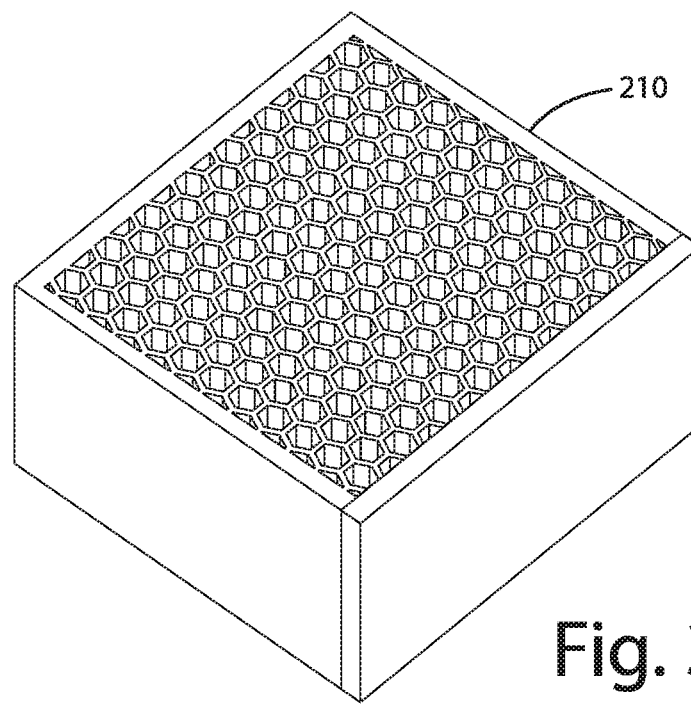
FIGS. 3A and 3B show perspective views of an additively manufactured 2D neutron collimator with honeycomb shaped cells made from boron carbide infiltrated with ethyl cyanoacrylate.
Figure 3B:
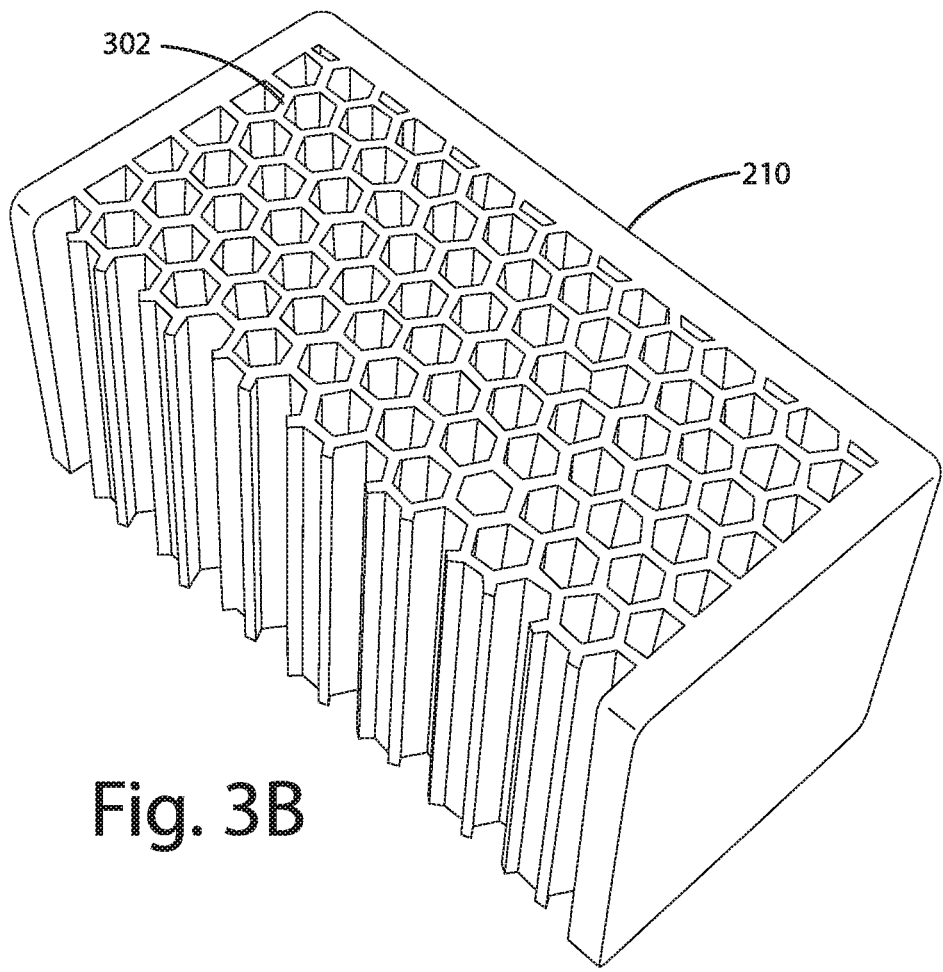

By manufacturing neutron absorbing collimators using additive manufacturing, the neutron collimator geometry can have complex cross sections which diverge in more than one plane. Square, circular, hexagonal and other shapes can easily be made with either constant or variable cross sections just as easily as simple shapes. FIGS. 3A and 3B show an additively manufactured 2D neutron absorbing collimator 210 with hexagonal cross section cells 302. Geometries that are either prohibitively expensive or simply impossible to manufacture by other means are easily achieved with additive manufacturing.

The exemplary boron carbide based collimator manufactured by one embodiment of the method of the present invention is illustrated in FIGS. 3A and 3B. The illustrated collimator has a honeycomb cross section. That is, the illustrated collimator has a grid of collimating elements in a single collimator. Parameters of the exemplary collimator are provided in Table 1, below. Specifically, H×W are the areal cross section dimensions of the collimator, L is the length, T is the wall thickness, and b is the flat-to-flat distance across the hexagonal opening of the collimator. The area percentage is the ratio of the cross-sectional area that does not contain absorbing material to the total cross section of the collimator.

TABLE 1

| Collimator | H × W (mm) | L (mm) | T (mm) | b (mm) | Area (%) |
|---|---|---|---|---|---|
| $B_4C$ | 49 × 58 | 30 | .5 | 3.4 | 77.1 |

Alternative embodiments of a neutron absorbing collimator can be additively manufactured with different characteristics. For example, a different areal cross section, different length, different wall length, and different grid pattern can be selected. By way of example, in an alternative embodiment, a boron carbide collimator can be additively manufactured with a honeycomb cross section that has a 0.75 mm wall thickness.

To preserve the collimating potential of the apparatus while reducing scattering of the collimator contributing to the measurement background, additional layers of boron carbide and/or cadmium shielding masks can be included on the front and/or back of the collimator. Alternatively, or in addition, the collimator can be wrapped in a sheath of cadmium and solid boron carbide or $^{10}B$ enriched solid boron carbide shielding to reduce background scattering due to the collimator. The material can be selected based on the neutron wavelengths used at the instrument.

By manufacturing a neutron absorbing collimator with additive manufacturing, it can be tailored to a series of collimations by adjusting the parameters of the collimator in the additive manufacturing process. For example, conventional collimators often have smaller wall thicknesses. The ability to manufacture a tailored collimator can provide a better overall transmission of the neutron beam.

Figure 4:
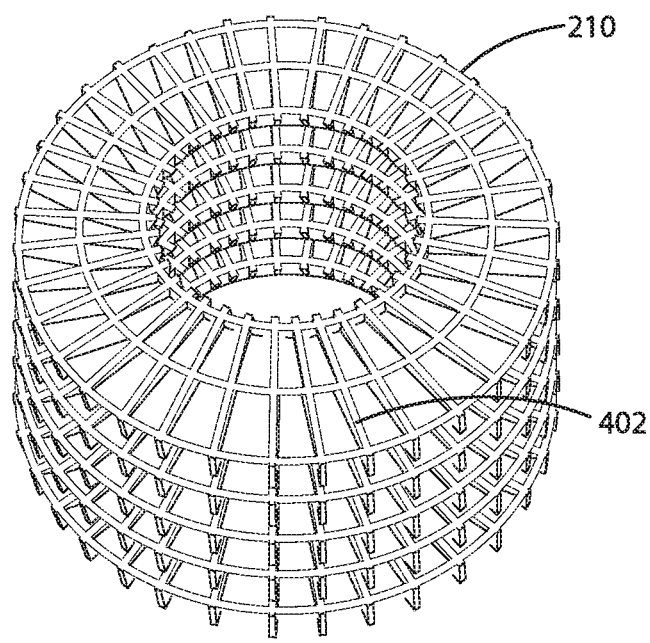
FIG. 4 shows an additively manufactured conical neutron collimator made from boron carbide infiltrated with ethyl cyanoacrylate.
Figure 5:
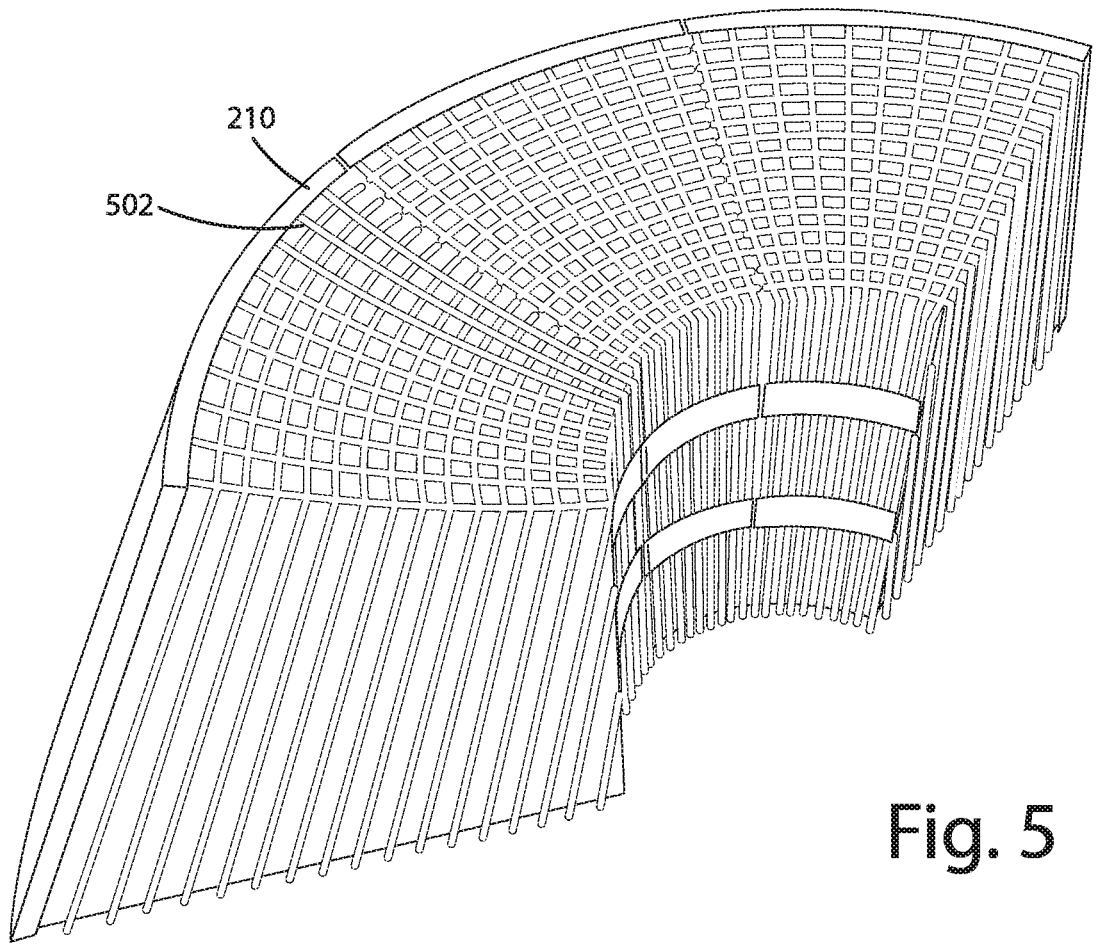
FIG. 5 shows another additively manufactured conical neutron collimator made from boron carbide infiltrated with ethyl cyanoacrylate.

One advantage of the current embodiment is the enabling of complex geometry part production that cannot be achieved economically or otherwise, from any other form of manufacturing. The ability to print directly from neutron absorbing material is transformative. FIGS. 4 and 5 illustrate additional collimator geometry including curved shapes and variable cross section geometry that from a practical standpoint are impossible to produce using traditional manufacturing methods, but can easily be accomplished using this method. Specifically, FIG. 4 shows a conical neutron absorbing collimator with a plurality of apertures 402 arranging in a divergent pattern. FIG. 5 shows another conical neutron absorbing collimator with a plurality of apertures 502.

Neutron absorbing materials can cause wear on additive manufacturing printer equipment. For example, boron carbide, in addition to being a good neutron absorbing material, is also an industrial abrasive and one of the hardest materials after diamonds. Use of Fused Deposition Modeling (FDM) or another additive manufacturing technique that requires the neutron absorbing material to be extruded through a print head can cause a significant amount of wear on the print head. By utilizing an additive manufacturing technique where the neutron absorbing material is not extruded through a print head, such as binder jet additive manufacturing, but instead delivered to the build platform in a different way, such as by way of a leveling roller as it is in some binder jet printers, the wear on the print head due to neutron absorbing material can be reduced or avoided altogether.

Neutron absorbing materials can cause wear on other printer components as well. For example, moving parts of the printer may be at risk of increased wear due to contact with the neutron absorbing material depending on the configuration and design of the printer. In some embodiments, the printer may optionally be modified to prevent or reduce the chance of the neutron absorbing material damaging the moving parts of the printer. That is, the neutron absorbing material, such as the boron carbide powder, can be physically isolated from the moving parts of the printer. For example, a bellows system can be installed on the print head rails that includes a fabric or other material that shields moving printer components from the neutron absorbing material.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of additively manufacturing a neutron collimator component with a binder jet printer, the method comprising:
    loading neutron absorbing powder into a powder feed supply of the binder jet printer;
    positioning a build platform of the binder jet printer;
    spreading, with a powder transport device, the neutron absorbing powder from the powder feed supply into a layer of a powder bed on the build platform;
    selectively depositing binder with a movable binder jet print head on the layer of neutron absorbing powder on the build platform by moving the binder jet printer head along binder jet printer head rails to form a pattern of binder on the layer that together with additional layers of neutron absorbing powder and binder forms a neutron collimator component in the powder bed;
    repeating said positioning the build platform of the binder jet printer, said spreading the neutron absorbing powder from the powder feed supply into additional layers on the build platform, and said selectively depositing binder with the movable binder jet print head on the layer of neutron absorbing powder on the build platform to binder jet print the neutron collimator component in the powder bed on the build platform;
    transporting the powder bed including the neutron collimator component from the build platform to a curing oven;
    heating the powder bed including the neutron collimator component in the curing oven to cure the neutron collimator component by evaporating solvent from the binder;
    de-powdering the neutron collimator component from the powder bed; and
    infiltrating the de-powdered neutron collimator component with ethyl cyanoacrylate to strengthen mechanical properties of the neutron collimator component without densification via sintering.

2. The method of claim 1 wherein the neutron absorbing component has less than 5% hydrogen by weight.

3. The method of claim 1 wherein the neutron absorbing component has less than 2% hydrogen by weight.

4. The method of claim 1, including physically isolating the neutron absorbing powder from moving parts of the binder jet with a bellows system installed on the binder jet printer, the bellows system including a shield for shielding moving binder jet printer components from the neutron absorbing powder.

5. The method of claim 1, wherein the neutron collimator component includes one or more pinholes.

6. The method of claim 1, wherein the neutron collimator component includes one or more apertures.

7. A method of additively manufacturing a neutron optic component with a binder jet printer, the method comprising:
    loading neutron absorbing powder into a powder feed supply of the binder jet printer;
    positioning a build platform of the binder jet printer;
    spreading, with a powder transport device, the neutron absorbing powder from the powder feed supply into a layer of a powder bed on the build platform;
    selectively depositing binder with a movable binder jet print head on the layer of neutron absorbing powder on the build platform by moving the binder jet printer head along binder jet printer head rails to form a pattern of binder on the layer that together with additional layers of neutron absorbing powder and binder forms a neutron optic component in the powder bed;
    repeating said positioning the build platform of the binder jet printer, said spreading the neutron absorbing powder from the powder feed supply into additional layers on the build platform, and said selectively depositing binder with the movable binder jet print head on the layer of neutron absorbing powder on the build platform to binder jet print the neutron optic component in the powder bed on the build platform;
    transporting the powder bed including the neutron optic component from the build platform to a curing oven;
    heating the powder bed including the neutron optic component in the curing oven to cure the neutron optic component by evaporating solvent from the binder;
    de-powdering the neutron optic component from the powder bed; and
    infiltrating the de-powdered neutron optic component with ethyl cyanoacrylate to strengthen mechanical properties of the neutron optic component without densification via sintering.

8. The method of claim 7 wherein the neutron absorbing component has less than 5% hydrogen by weight.

9. The method of claim 7 wherein the neutron absorbing component has less than 2% hydrogen by weight.

10. The method of claim 7, including physically isolating the neutron absorbing powder from moving parts of the binder jet with a bellows system installed on the binder jet printer, the bellows system including a shield for shielding moving binder jet printer components from the neutron absorbing powder.

11. The method of claim 7, wherein the neutron optic component is a neutron collimator.

* * * * *